United States Patent
Birru et al.

(10) Patent No.: US 8,418,035 B2
(45) Date of Patent: Apr. 9, 2013

(54) METHOD AND SYSTEM OF SINGLE CARRIER BLOCK TRANSMISSION WITH PARALLEL ENCODING AND DECODING

(75) Inventors: Dagnachew Birru, Yorktown Heights, NY (US); Seyed-Alireza Seyedi-Esfahani, Fairport, NY (US); Richard Chen, Croton-on-Hudson, NY (US); Hong Zhai, Ossining, NY (US); Chun-Ting Chou, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/522,967

(22) PCT Filed: Jan. 17, 2008

(86) PCT No.: PCT/IB2008/050176
§ 371 (c)(1), (2), (4) Date: Feb. 9, 2010

(87) PCT Pub. No.: WO2008/087603
PCT Pub. Date: Jul. 24, 2008

(65) Prior Publication Data
US 2010/0146363 A1    Jun. 10, 2010

Related U.S. Application Data

(60) Provisional application No. 60/885,663, filed on Jan. 19, 2007.

(51) Int. Cl.
*H03M 13/00* (2006.01)
(52) U.S. Cl.
USPC ............ 714/776; 370/204; 370/210; 375/265
(58) Field of Classification Search .................. 714/776; 370/204, 210
See application file for complete search history.

(56) References Cited

U.S. PATENT DOCUMENTS

| | | | |
|---|---|---|---|
| 6,490,705 B1 * | 12/2002 | Boyce | 714/776 |
| 6,985,725 B2 * | 1/2006 | Berger | 455/429 |
| 2005/0128966 A1 * | 6/2005 | Yee | 370/310 |
| 2007/0189151 A1 * | 8/2007 | Pan et al. | 370/210 |

* cited by examiner

FOREIGN PATENT DOCUMENTS

| | | |
|---|---|---|
| EP | 1814236 A1 | 1/2007 |
| JP | 03242027 A | 10/1991 |
| WO | WO2006118411 A2 | 11/2006 |

OTHER PUBLICATIONS

Zhou et al. Single-Carrier Space-Time Block_Coded Transmissions Over Frequency-Selective Fading Channels. IEEE Transaction on information theory, vol. 49, No. 1 Jan. 2003, pp. 164-179.*

*Primary Examiner* — Sam Rizk
(74) *Attorney, Agent, or Firm* — Larry Liberchuk

(57) ABSTRACT

A Single Carrier Block Transmission (SCBT) system employs an inherently parallel approach to error correction processing. At the transmission system (200), an incoming data stream is split (210) into P parallel data streams, each having a data rate equal to a fraction of the incoming data stream's data rate. The parallel data streams are then each separately encoded (220) in P parallel encoding processes (beneficially, using P parallel encoders (222)). The P separately encoded data streams are then merged (330), interleaved (320), and mapped (310) into a single stream of encoded symbols, which are transmitted to the receiver using an arbitrary modulation (240) and transmission scheme. At the receiver (255), the received data stream is de-interleaved (350) and split into P encoded data streams, which are then decoded (285) using P parallel decoders. Then, the decoded data streams are combined or multiplexed (295) into a single data stream.

21 Claims, 8 Drawing Sheets

METHOD AND SYSTEM OF SINGLE CARRIER BLOCK TRANSMISSION WITH PARALLEL ENCODING AND DECODING

CROSS-REFERENCES TO RELATED APPLICATION

This patent application claims the priority benefit under 35 U.S.C. §119(e) of U.S. Provisional Patent Application 60/885,663, filed on 19 Jan. 2007, the entirety of which is hereby incorporated by reference for all purposes as if fully set forth herein.

TECHNICAL FIELD

This invention pertains to the field of wireless communications, and more particularly to a system and method of single carrier block transmission with parallel encoding and decoding.

BACKGROUND AND SUMMARY

Single Carrier Block Transmission (SCBT) is a very attractive technique for wireless communications. In an SCBT arrangement, a block of symbols (e.g. QAM or PSK symbols) with length N is preceded by a guard interval, which can employ either a cyclic prefix (CP) or zero padding (ZP). A system employing SCBT is equivalent to an OFDM system with full spreading, if an N×N Fourier matrix is used as the spreading (code) matrix. Mathematically, the transmitted signal, s, from a spread OFDM system can be written as.

$$s = PF^{-1}Cx \quad (1)$$

where x is the N×1 vector of the information symbols, C is the N×N spreading matrix, F−1 is the inverse Fourier transform matrix (also N×N). The matrix P creates the guard interval (GI) and is of the size (N+$N_{GI}$)×N, where $N_{GI}$ is the length of the guard interval GI.

In the case where the guard interval employs a cyclic prefix (CP), then the P matrix is:

$$P = \begin{bmatrix} 0_{N_{GI} \times N - N_{GI}} \mid I_{N_{GI}} \\ I_N \end{bmatrix}. \quad (2)$$

On the other hand, when the guard interval employs zero padding, then the P matrix is:

$$P = \begin{bmatrix} 0_{N_{GI} \times N - N_{GI}} \mid 0_{N_{GI}} \\ I_N \end{bmatrix}. \quad (3)$$

It can be shown that SCBT is a special case of the above form, where the spreading matrix is the Fourier matrix, i.e. C=F. In that case we have:

$$s = Px. \quad (4)$$

This means that the simple transmission of the symbol vector x is preceded by a guard interval GI.

A system employing single carrier transmission with the guard interval as described above has the advantages of an OFDM system in dealing with multipath interference, but does not have some of the disadvantages of OFDM systems, namely high Peak-to-Average-Power-Ratio (PAPR) and the need for high resolution ADC. In terms of performance, a single carrier system with a guard interval outperforms OFDM systems, if a high rate channel code (or no coding) is used.

Meanwhile, new communication systems and networks are being developed to operate with increasingly higher data rates. For example, new wireless personal area networks (WPANs) are being developed in the 60 GHz band that can communicate at multigigabit/second data rates.

So, it would be desirable to employ SCBT for these wideband, high data rate WPANs.

However, to have a robust high rate wireless communication system over multipath channels, a channel code must be used. While implementation of the encoder (e.g. a convolutional encoder) is often simple, implementation of the decoder (e.g. a Viterbi algorithm) is generally much more difficult. When the transmission rates in a wireless communication system are very high (e.g., multi-gigabits/second), then the existing digital technology cannot provide the required processing speed for a straight forward implementation of the decoder. For example, with today's technology, a Viterbi decoder with multi-gigabit rates (e.g. 3-5 Gbps) cannot be implemented.

Accordingly, it would be desirable to provide a method of single carrier block transmission capable of operating at higher data rates. It would also be desirable to provide a wireless device that includes a single carrier block transmitter capable of operating at higher data rates. It would further be desirable to provide a method of receiving a single carrier block transmission capable of operating at higher data rates. It would be still further desirable to provide a wireless device that includes single carrier block receiver capable of operating at higher data rates.

In one aspect of the invention, a method of transmitting data comprises: dividing a set of data into a plurality of data streams; separately encoding each of the data streams with a corresponding error correction code to produce a plurality of encoded data streams; generating a single carrier block transmission (SCBT) signal from the plurality of encoded data streams; and transmitting the SCBT signal.

In another aspect of the invention, a wireless device comprises: a demultiplexer adapted to divide a set of data into a plurality of data streams; an error correction encoding unit adapted to separately encode each of the data streams with a corresponding error correction code to produce a plurality of encoded data streams; a transmission signal processor adapted to produce a plurality of symbols from the plurality of encoded data streams; and a single carrier block transmission (SCBT) modulator adapted to produce an SCBT signal from the plurality of symbols.

In yet another aspect of the invention, a method of receiving data comprises: processing a single carrier block transmission (SCBT) signal to produce received symbols; generating a plurality of encoded data streams from the received symbols; separately decoding each of the encoded data streams to produce a plurality of decoded data streams; and combining the decoded data streams.

In still another aspect of the invention, a wireless device comprises: an SCBT demodulator adapted to demodulate a single carrier block transmission (SCBT) signal and to generate therefrom received symbols; a receiver signal processor adapted to produce a plurality of encoded data streams from the received symbols; a plurality of error correction decoders, each adapted to decode a corresponding one of the encoded data streams, to produce a plurality of decoded data streams; and a multiplexer adapted to combine the decoded data streams.

DETAILED DESCRIPTION

Figure 1:
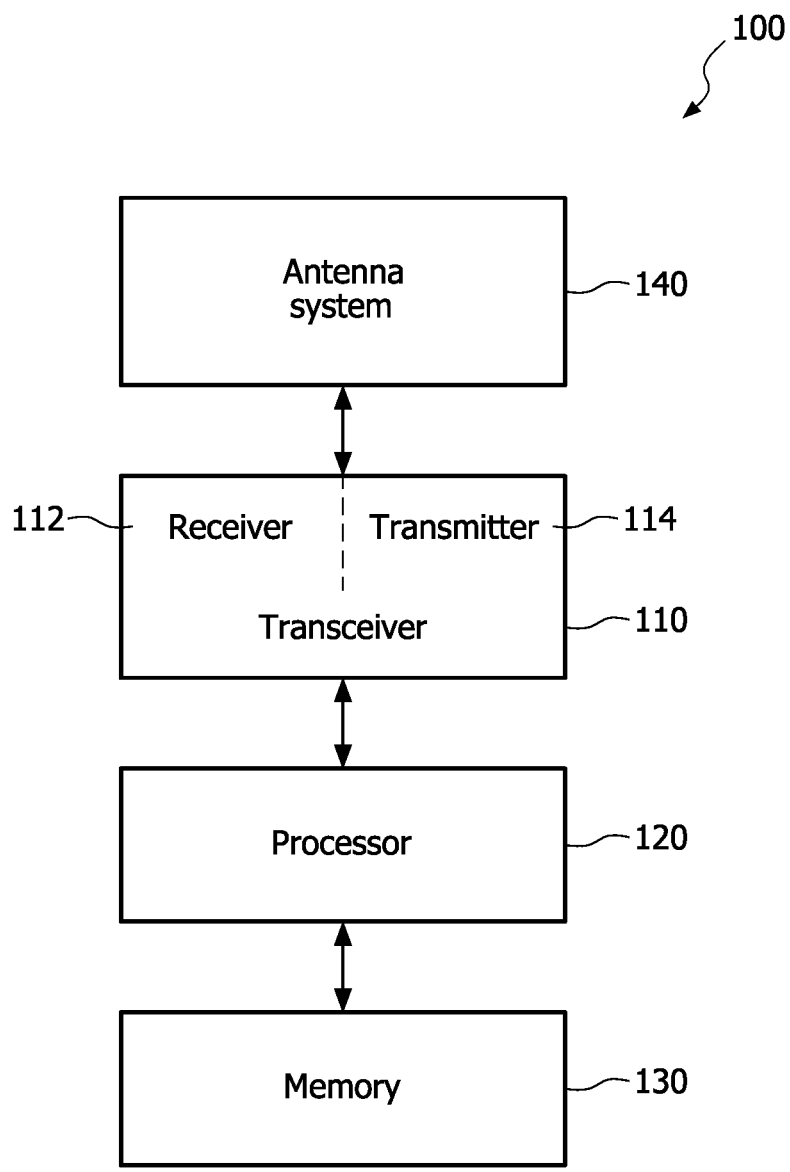
FIG. 1 is a functional block diagram of one embodiment of a wireless device.

FIG. 1 is a functional block diagram of a wireless device 100. As will be appreciated by those skilled in the art, one or more of the various "parts" shown in FIG. 1 may be physically implemented using a software-controlled microprocessor, hard-wired logic circuits, or a combination thereof. Also, while the parts are functionally segregated in FIG. 1 for explanation purposes, they may be combined variously in any physical implementation.

Wireless device 100 includes a transceiver 110, processor 120, memory 130, and a directional antenna system 140.

Transceiver 110 includes a receiver 112 and a transmitter 114 and provides functionality for wireless device 100 to communicate with other wireless devices in a wireless communication network according to the standard protocols of the wireless communication network. For example, in one embodiment wireless device 100 may be a UWB wireless device adapted to operate using a communication protocol according to the WiMedia specifications.

Processor 120 is configured to execute one or more software algorithms in conjunction with memory 130 to provide the functionality of wireless device 100. Beneficially, processor 120 includes its own memory (e.g., nonvolatile memory) for storing executable software code that allows it to perform the various functions of wireless device 100. Alternatively, the executable code may be stored in designated memory locations within memory 130.

Beneficially, antenna system 140 may include an omni-directional capability and/or a directional antenna capability.

Viterbi algorithms for decoding encoded data streams having data rates of approximately 500 Mbps or more generally need to be implemented using parallel structures. In general, if P parallel structures are employed, the required processing speed can be reduced by a factor of P. However the "price" of reducing the processing speed requirement is an increase in complexity by more than a factor of P. Additional circuitry and design effort is typically required to design a parallelized implementation for decoding a single encoded data stream.

Beneficially, a communication system as described herein employs an "inherently parallel" approach to error correction processing. In particular, in one embodiment of a Single Carrier Block Transmission (SCBT) system, at the transmission system the incoming data stream is split into P parallel data streams, each having a data rate equal to a fraction of the incoming data stream's data rate. These data streams are then each separately encoded in P parallel encoding processes (beneficially, using P parallel encoders). The P separately encoded data streams are then merged and interleaved into a single coded data stream, which is transmitted to the receiver using an arbitrary modulation and transmission scheme. At the receiver, the received data stream is de-interleaved and split into P encoded data streams, which are then decoded using P parallel decoders. Then, the decoded data streams are combined or multiplexed into a single data stream.

In general, it is not necessary that all of the separately encoded data streams have the same data rate, or that they are encoded or decoded using the same code. Of course at the receive end, the data stream must be processed complementary to the transmission processing to produce data streams having the same data rates as those employed at the transmission side, and decoded according to the various codes employed at the transmission side. In this general case, the required processing speed for implementation of the decoders is reduced by a factor of:

$$\frac{R}{\max_{p=1,\ldots,P}(R_p)} \tag{5}$$

where R is the data rate of the incoming stream and $R_p$ is the data rate of the $p^{th}$ separately encoded data stream.

One embodiment of an "inherently parallel" SCBT transmission system with parallel encoding, where $R_p=R/P$, can be easily compared to a conventional system where the incoming stream is encoded as one data stream using one code and a parallelized structure is used to implement the decoder. In this case, the inherently parallel method of this is superior in terms of complexity and decoding latency and required speed. The implementation of P parallel structures for decoding P parallelized encoded data streams requires less complexity and design effort compared to the complexity and design effort needed to parallelize a non-parallel decoding algorithm. The decoding latency is also improved since when a block data is broken into P sub-blocks, each sub-block is shorter by a factor of P, hence the time required to decode this block is shortened by a factor of P.

Figure 2:
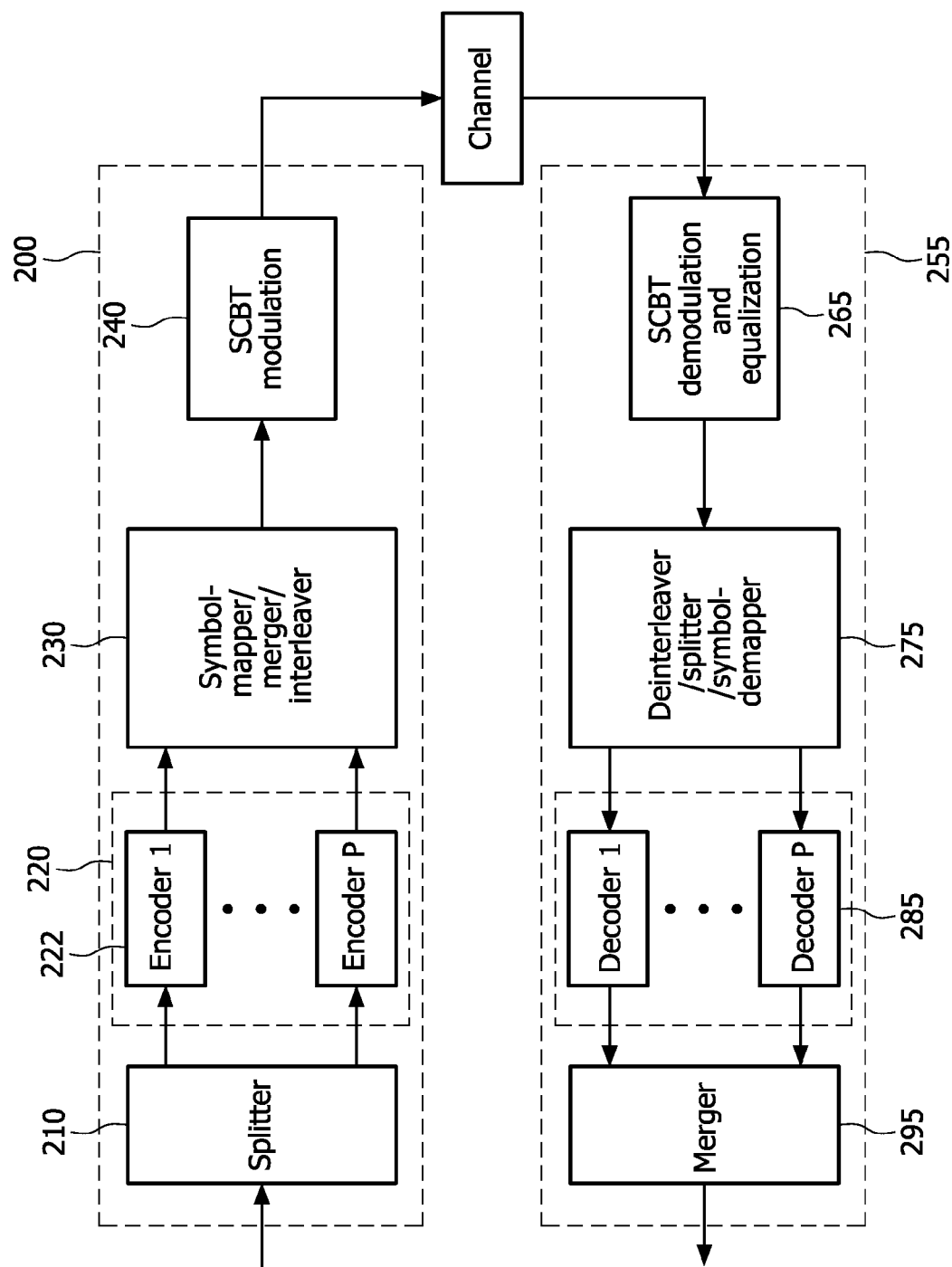
FIG. 2 is a functional block diagram of an SCBT system that employs parallel encoding and decoding.

FIG. 2 is a functional block diagram illustrating an SCBT system that employs parallel encoding and decoding. The SCBT system of FIG. 2 includes a transmission system 200 and a receiving system 255. In one embodiment, transmission system 200 can be provided as transmitter 114 of the wireless device 100 of FIG. 1, and receiving system 255 can be provided as receiver 112 of wireless device 100.

Transmission system 200 includes a demultiplexer 210 (also referred to as a splitter or divider), an error correction encoding unit 220, a transmission signal processor 230, and an SCBT modulator 240. Beneficially, error correction encoding unit 220 comprises a plurality, P, of error correction encoders 222. As will be discussed in greater detail below with respect to various concrete embodiments, transmission signal processor 230 includes one or more symbol mappers, one or more interleavers, and a multiplexer (also referred to as a merger or combiner).

Receiving system 255 includes an SCBT demodulator 265, a receiver signal processor 275, a plurality of error correction decoders 285, and a multiplexer 295 (also referred to as a merger or combiner). As will be discussed in greater detail below with respect to various concrete embodiments, receiver signal processor 275 includes one or more symbol demappers, one or more deinterleavers, and a demultiplexer (also referred to as a splitter or divider).

Functionally, at transmission system 200, demultiplexer 210 divides a set of data (e.g., a data stream) into a plurality of data streams. Encoding unit 220 separately encodes each of the data streams with a corresponding error correction code to produce a plurality of encoded data streams. Beneficially, each of the error correction encoders 222 separately encodes a corresponding one of the plurality of data streams. Transmission signal produces a plurality of symbols from the plurality of encoded data streams. SCBT modulator 240 produces an SCBT signal from the plurality of symbols.

The SBCT signal is then transmitted over a communication channel (e.g., a wireless channel of a wireless network) to receiving system 255.

At receiving system 255, SCBT demodulator 265 demodulates the SCBT signal and generates therefrom a plurality of received symbols. Receiver signal processor 275 produces a plurality of encoded data streams from the received symbols. The error correction decoders 285 each perform error correction decoding on a corresponding one of the encoded data streams, thereby producing a plurality of decoded data streams. Multiplexer 295 combines the decoded data streams.

Transmission signal processor 230 and receiver signal processor 275 can each be configured in a variety of ways to perform their corresponding functions and accordingly, several embodiments of the SCBT system of FIG. 1 are possible. A non-exhaustive set of some of these embodiments are illustrated in FIGS. 3-8, and will now be described briefly.

Figure 3A:
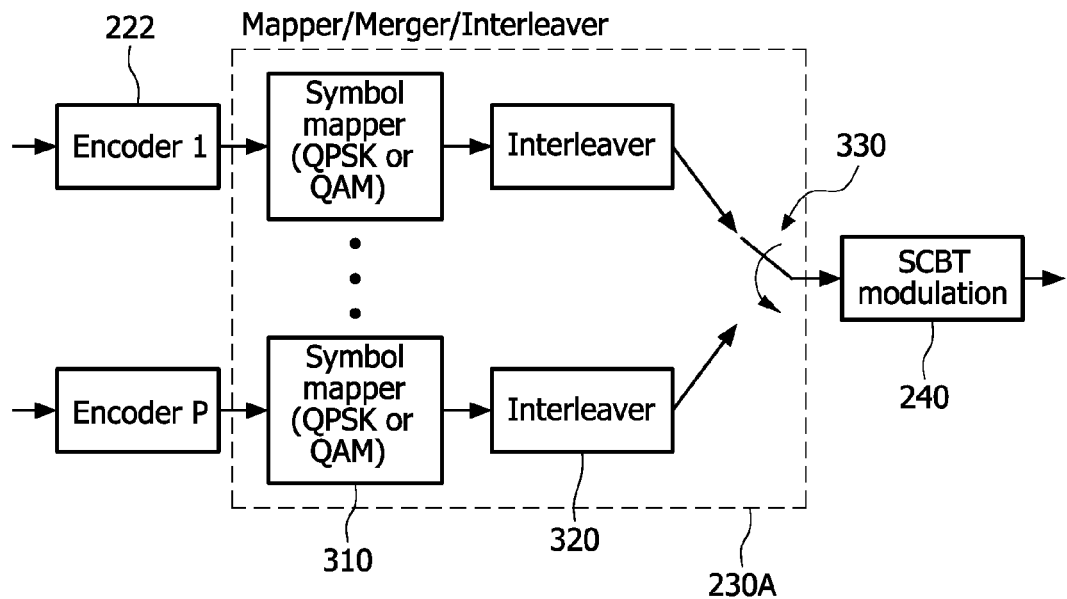
FIGS. 3A-B illustrate a first embodiment of an SCBT system that employs parallel encoding and decoding.
Figure 3B:
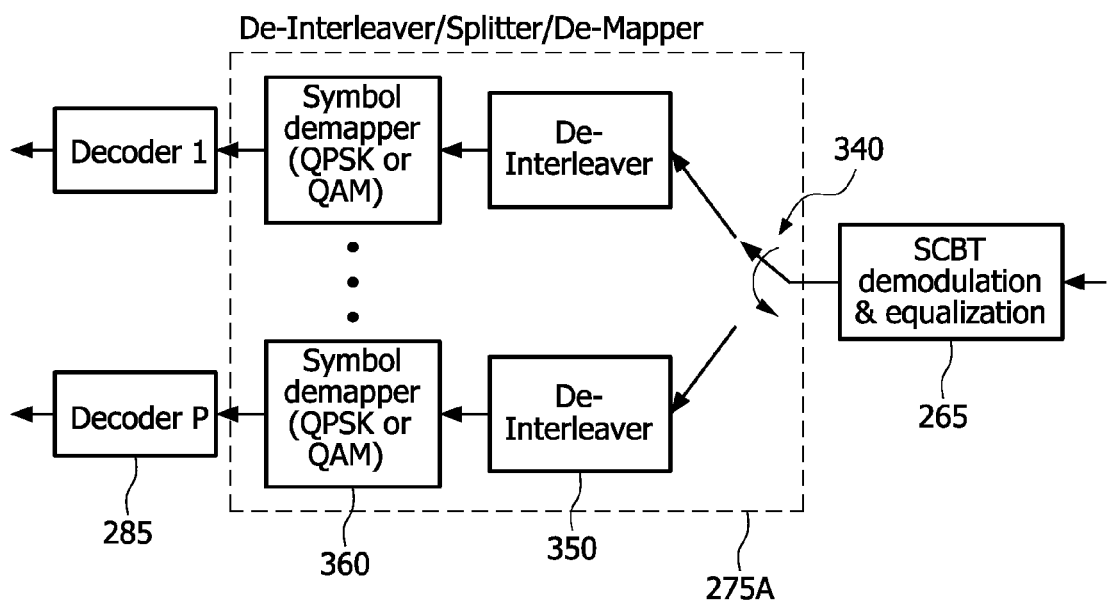

FIGS. 3A-B illustrate a first embodiment of an SCBT system that employs parallel encoding and decoding. Components that are the same as those described above with respect to FIG. 2 are indicated with the same numerals, and the description thereof will not be repeated here.

In FIG. 3A, transmission signal processor 230A comprises a plurality (P) of symbol mappers 310, a plurality of interleavers 320, and a multiplexer 330. Meanwhile, in FIG. 3B, receiver signal processor 275A comprises a demultiplexer 340, a plurality (P) of deinterleavers 350, and a plurality (P) of symbol demappers 360.

Operationally, at the transmission system 200 (FIG. 3A) the P parallel encoded bit streams from error correction encoders 222 are mapped into symbols by symbol mappers 310 using M-PSK or M-QAM constellations. These symbol streams are then interleaved separately by interleavers 320. Different types of interleavers 320 (e.g. a block interleaver) may be used for different streams. The interleaved symbol streams are then multiplexed by multiplexer 330 into one symbol stream, and finally mapped onto SCBT blocks by SCBT modulator 240.

For example, if Q=N/P, where N is the SCBT block length, P is the number of streams into which the original data set is divided, and $s_{P,k}$ is the interleaved symbol at time k from branch p, then the SCBT block can be written as:

$$s_{1,k}, s_{2,k}, \ldots, s_{P,k}, s_{1,k+1}, s_{2,k+1}, \ldots, s_{P,k+1}, \ldots, s_{1,k+Q}, s_{2,k+Q}, \ldots, s_{P,k+Q} \quad (6)$$

Similarly, at the receiving system 255 (FIG. 3B), SCBT demodulator 265 demodulates the SCBT signal into a plurality of received symbols, $s_{P,k}$. Demultiplexer 340 demultiplexes the symbols $s_{P,k}$ into P symbol streams. Deinterleavers 350 each separately deinterleave a corresponding symbol stream. Symbol demappers 360 each separately demap a corresponding deinterleaved symbol stream to produce a corresponding encoded data stream error correction decoders 285 each perform error correction decoding on a corresponding one of the encoded data streams, thereby producing a plurality of decoded data streams, as described with respect to FIG. 2

Figure 4A:
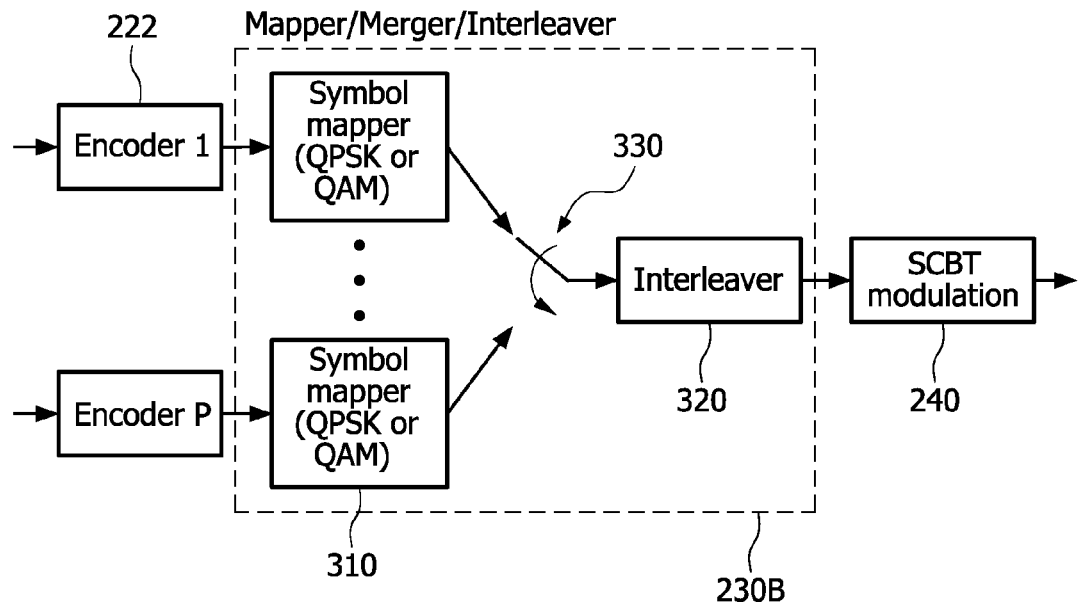
FIGS. 4A-B illustrate a second embodiment of an SCBT system that employs parallel encoding and decoding.
Figure 4B:
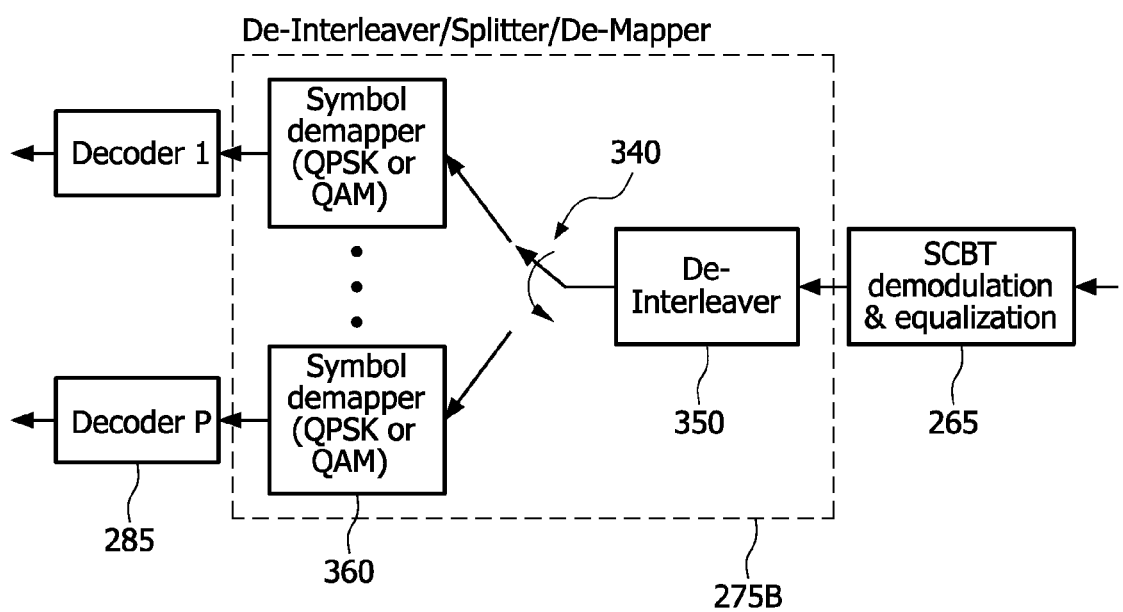

FIGS. 4A-B illustrate a second embodiment of an SCBT system that employs parallel encoding and decoding. This embodiment is similar to the previous one, with the difference being that at the transmission signal processor 230B, the symbols are de-multiplexed into a single stream before they are interleaved. Similarly, at the receiver signal processor 275B, the symbols are first de-interleaved, and then are multiplexed into P data streams, and then the P data streams are de-mapped.

Figure 5A:
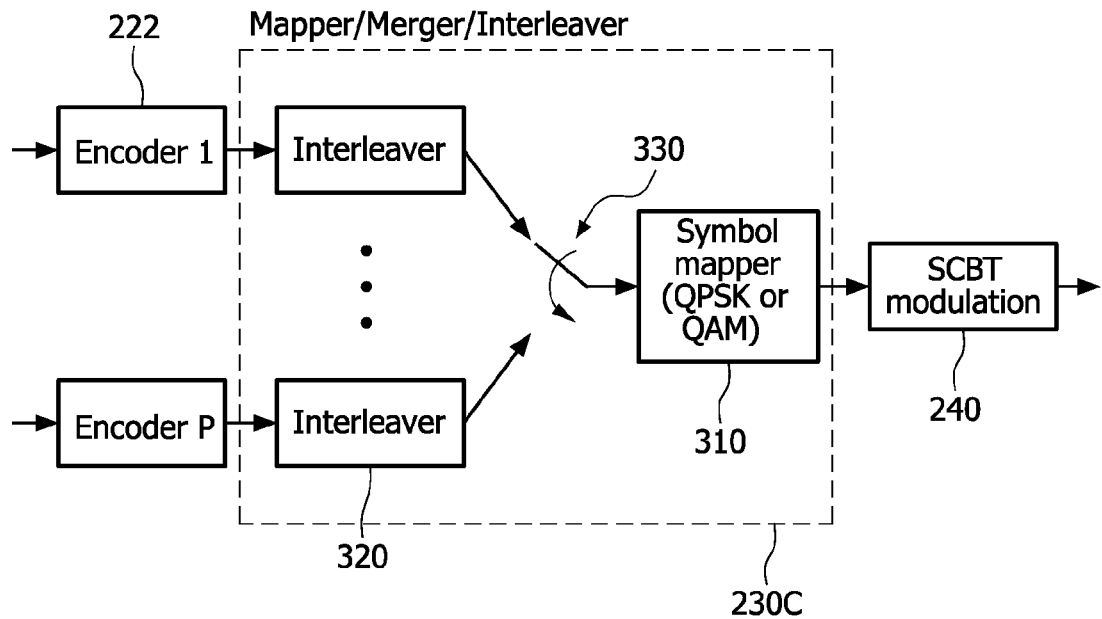
FIGS. 5A-B illustrate a third embodiment of an SCBT system that employs parallel encoding and decoding.
Figure 5B:
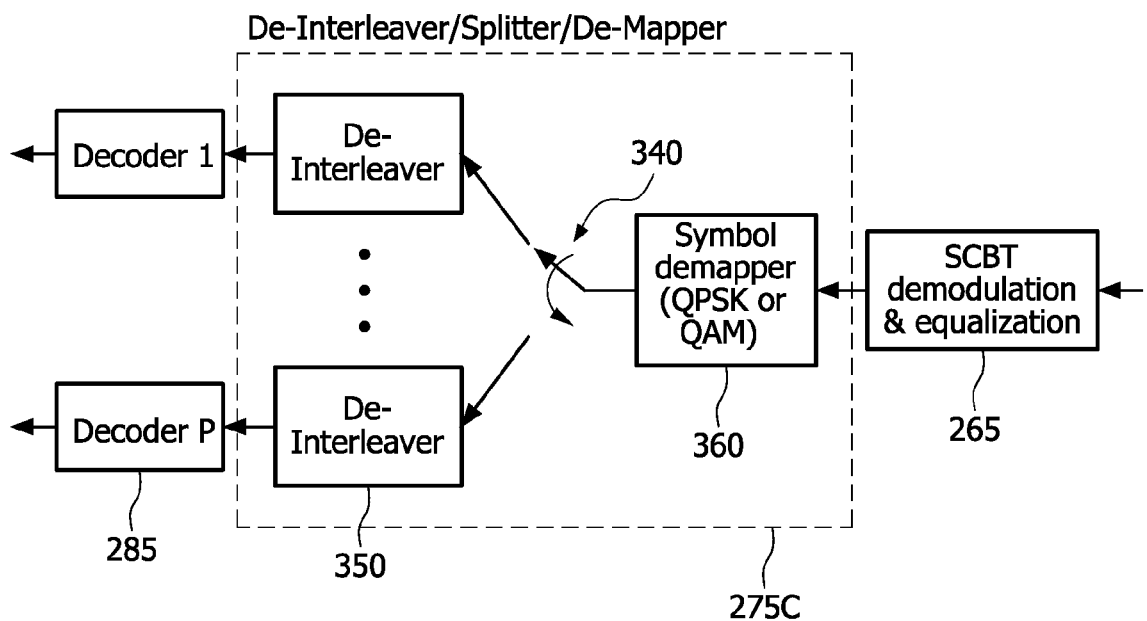

FIGS. 5A-B illustrate a third embodiment of an SCBT system that employs parallel encoding and decoding. In this embodiment, the transmission signal processor 230C first separately interleaves the separately encoded bit streams. Then multiplexer 330 merges the separately interleaved, separately encoded data streams into a single bit stream. Symbol mapper then maps the bitstream into QAM or PSK symbols before they are mapped into a SCBT block by SCBT modulator 240. At the receiver signal processor 275C, the signal processing is complementary: Symbol demapper 360 demaps symbols received from SCBT demodulator 265 into a bitstream; demultiplexer 340 demultiplexes the bitstream into a plurality of interleaved encoded date streams; and a plurality of deinterleavers 350 each of which deinterleaves a corresponding interleaved data stream to produce the plurality of coded data streams.

Figure 6A:
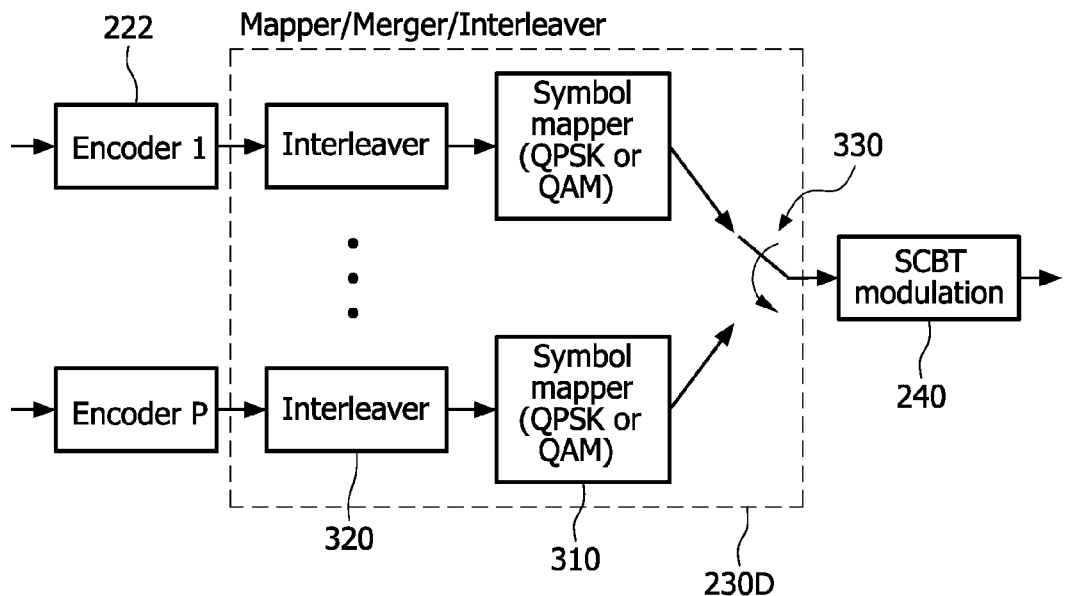
FIGS. 6A-B illustrate a fourth embodiment of an SCBT system that employs parallel encoding and decoding.
Figure 6B:
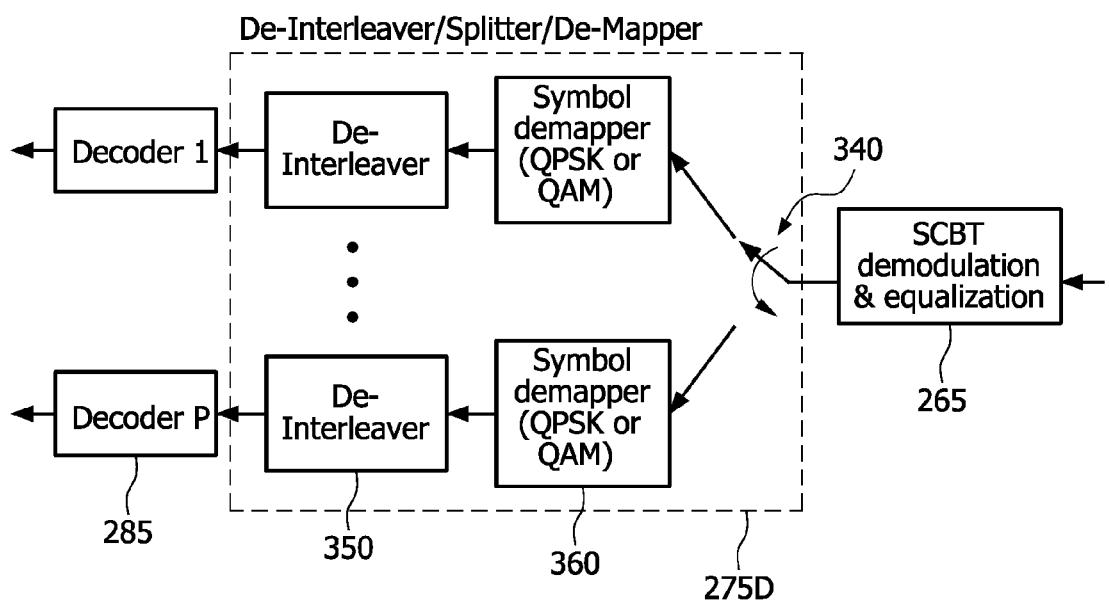
Figure 7A:
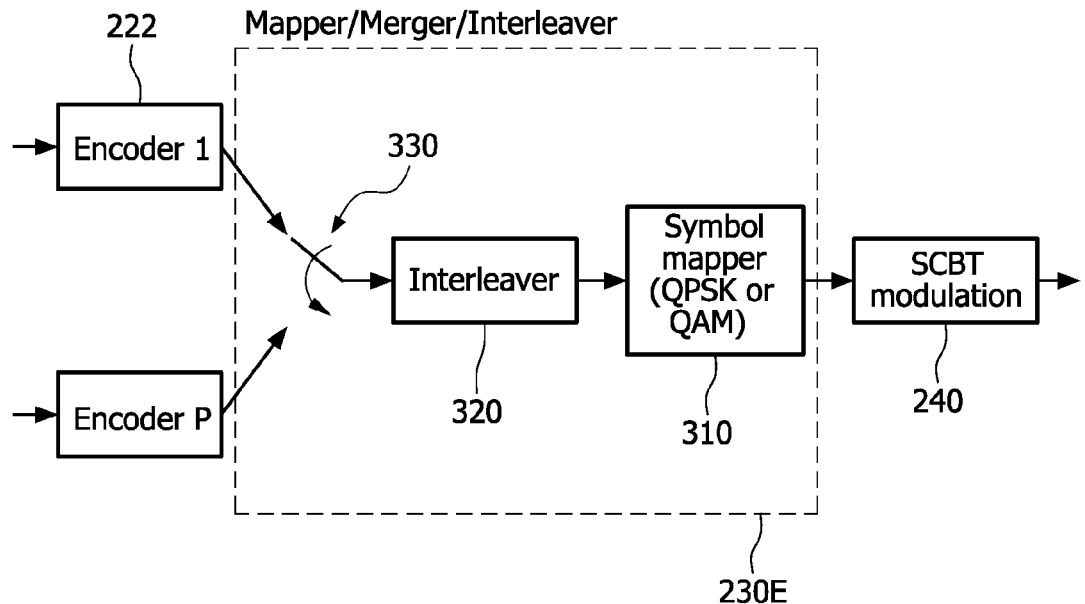
FIGS. 7A-B illustrate a fifth embodiment of an SCBT system that employs parallel encoding and decoding.
Figure 7B:
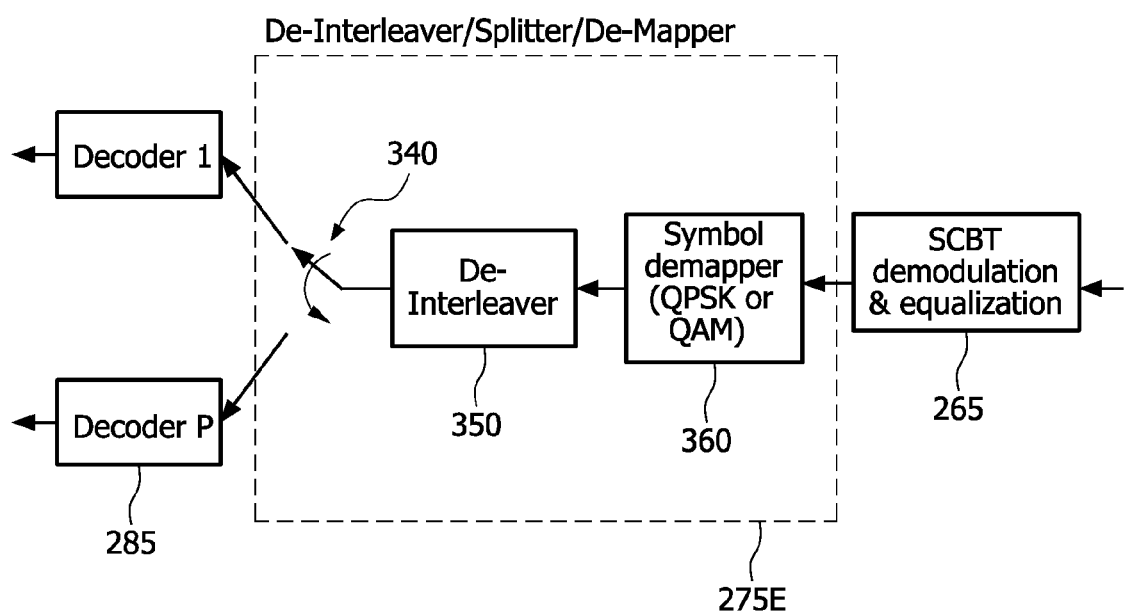

FIGS. 6A-B illustrate a fourth embodiment of an SCBT system that employs parallel encoding and decoding. This embodiment is similar to the previous one, with the difference that at the transmission signal processor 230D, the interleaved bits are first mapped onto QAM or QPSK symbols before they are de-multiplexed into a single stream. Similarly, at the receiver signal processor 275D, the symbols are first multiplexed into P streams, then they are de-mapped and de-interleaved FIGS. 7A-B illustrate a fifth embodiment of an SCBT system that employs parallel encoding and decoding. In this embodiment, at the transmission signal processor 230E the encoded bits are first de-multiplexed into a single stream, then interleaved and mapped to symbols. Similarly, at the receiver signal processor 275E, the received symbols are first de-mapped. Then the de-mapped bits are interleaved before they are multiplexed into P sub-streams.

Figure 8A:
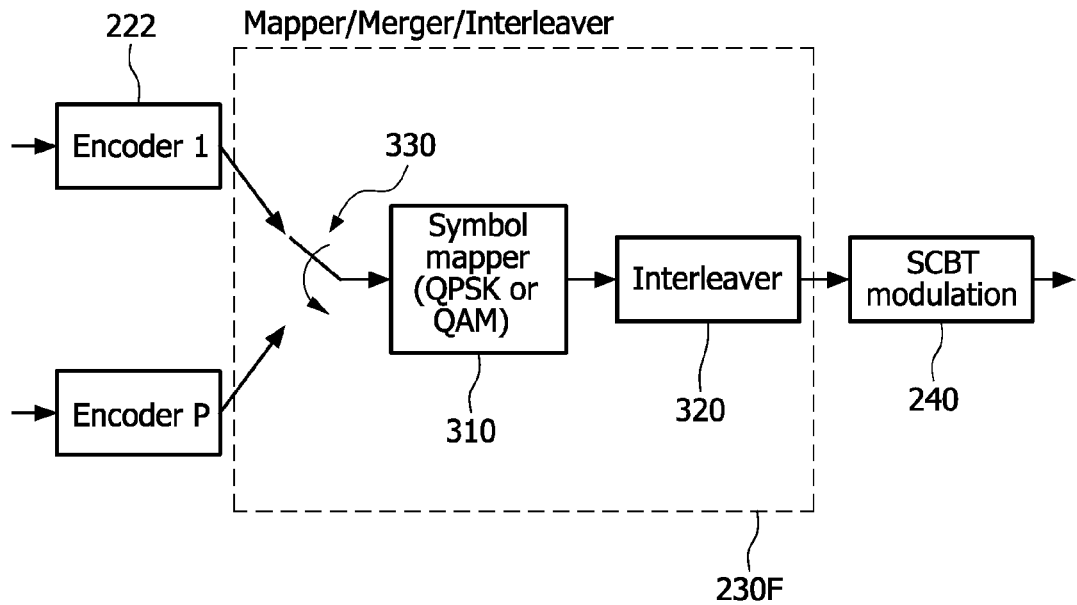
FIGS. 8A-B illustrate a sixth embodiment of an SCBT system that employs parallel encoding and decoding.
Figure 8B:
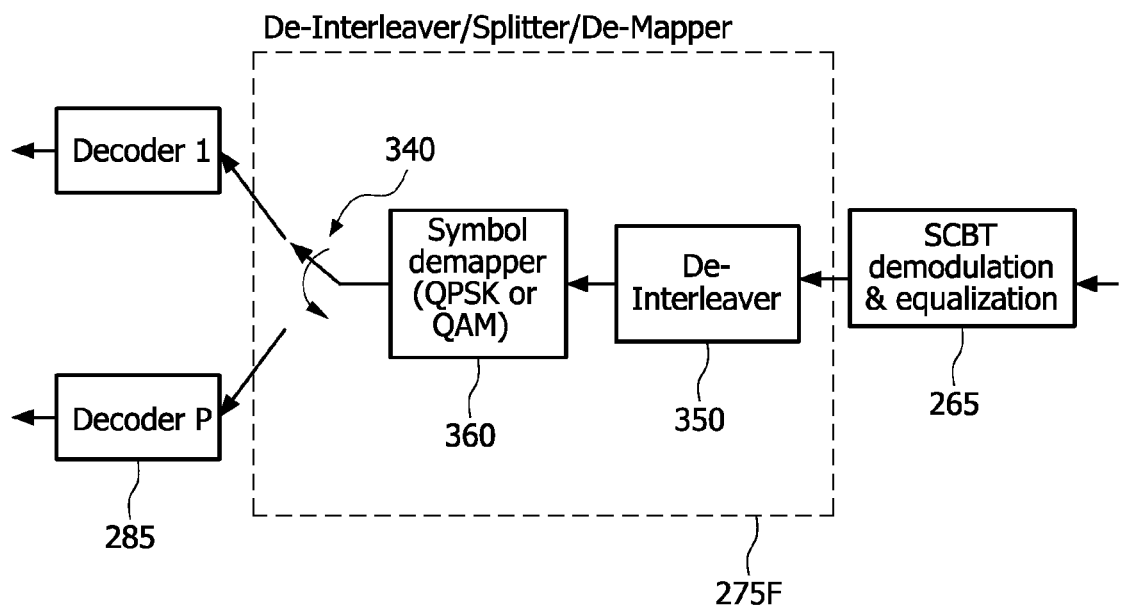

FIGS. 8A-B illustrate a sixth embodiment of an SCBT system that employs parallel encoding and decoding. In this embodiment, at the transmission signal processor 230F, the parallel encoded bits are first de-multiplexed into a single stream, and then they are mapped into QAM or QPSK symbols. These symbols are then interleaved and placed into a SCBT block. At the receiver signal processor 275F, the received symbols are first de-interleaved before they are de-mapped into bits, which are then multiplexed into sub-streams for decoding.

While preferred embodiments are disclosed herein, many such variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of transmitting data, comprising:
dividing a set of data into a plurality of data streams;
separately encoding each of the data streams with a corresponding error correction code to produce a plurality of encoded data streams;
generating a single carrier block transmission (SCBT) signal from the plurality of encoded data streams; and
transmitting the SCBT signal.

2. The method of claim 1, wherein generating a single carrier block transmission (SCBT) signal from the plurality of encoded data streams comprises:
generating a stream of modulated symbols from the plurality of encoded data streams; and
mapping the modulated symbols into SCBT blocks.

3. The method of claim 1, wherein dividing a set of data into a plurality of data streams comprises dividing the set of data into the plurality of data streams wherein at least two of the data streams have different data rates than each other.

4. The method of claim 1, wherein separately encoding each of the plurality of encoded data streams comprises encoding the data streams such that at least two of the encoded data streams are encoded with codes that are different than each other.

5. A wireless device, comprising:
a demultiplexer adapted to divide a set of data into a plurality of data streams;
an error correction encoding unit adapted to separately encode each of the data streams with a corresponding error correction code to produce a plurality of encoded data streams;
a transmission signal processor adapted to produce a plurality of symbols from the plurality of encoded data streams; and
a single carrier block transmission (SCBT) modulator adapted to produce an SCBT signal from the plurality of symbols.

6. The wireless device of claim 5, wherein the transmission signal processor comprises:
a plurality of symbol mappers;
a plurality of interleavers each operatively connected to an output of one of the symbol mappers; and
a multiplexer operatively connected to outputs of the interleavers.

7. The wireless device of claim 5, wherein the transmission signal processor comprises:
a plurality of symbol mappers;
a multiplexer operatively connected to outputs of the symbol mappers; and
an interleaver operatively connected to an output of the multiplexer.

8. The wireless device of claim 5, wherein the transmission signal processor comprises:
a plurality of interleavers;
a multiplexer operatively connected to outputs of the interleavers; and
a symbol mapper operatively connected to an output of the multiplexer.

9. The wireless device of claim 5, wherein the transmission signal processor comprises:
a plurality of interleavers;
a plurality of symbol mappers each operatively connected to an output of one of the interleavers; and
a multiplexer operatively connected to outputs of the symbol mappers.

10. The wireless device of claim 5, wherein the transmission signal processor comprises:
a multiplexer;
an interleaver operatively connected to an output of the multiplexer; and
a symbol mapper operatively connected to an output of the interleaver.

11. The wireless device of claim 5, wherein the transmission signal processor comprises:
a multiplexer;
a symbol mapper operatively connected to an output of the multiplexer; and
an interleaver operatively connected to an output of the symbol mapper.

12. A method of receiving data, comprising:
processing a single carrier block transmission (SCBT) signal to produce received symbols;
generating a plurality of encoded data streams from the received symbols;
separately decoding each of the encoded data streams to produce a plurality of decoded data streams; and
combining the decoded data streams.

13. The method of claim 12, wherein generating a plurality of encoded data streams from the received symbols comprises generating at least two encoded data streams having different data rates than each other.

14. The method of claim 12, wherein separately decoding each of the encoded data streams comprises decoding at least two encoded data streams that are encoded with codes that are different than each other.

15. A wireless device, comprising:
an SCBT demodulator adapted to demodulate a single carrier block transmission (SCBT) signal and to generate therefrom received symbols;
a receiver signal processor adapted to produce a plurality of encoded data streams from the received symbols;
a plurality of error correction decoders, each adapted to decode a corresponding one of the encoded data streams, to produce a plurality of decoded data streams; and
a multiplexer adapted to combine the decoded data streams.

16. The wireless device of claim 15, wherein the receiver signal processor comprises:
a demultiplexer;
a plurality of deinterleavers operatively connected to outputs of the demultiplexer; and
a plurality of symbol demappers each operatively connected to an output of one of the deinterleavers.

17. The wireless device of claim 15, wherein the receiver signal processor comprises:
a deinterleaver;
a demultiplexer operatively connected to an output of the deinterleaver; and
a plurality of symbol demappers each operatively connected to an output of the demultiplexer.

18. The wireless device of claim 15, wherein the receiver signal processor comprises:
a symbol demapper;
a demultiplexer operatively connected to an output of the symbol demapper; and
a plurality of deinterleavers each operatively connected to an output of the demultiplexer.

19. The wireless device of claim 15, wherein the receiver signal processor comprises:
a demultiplexer;
a plurality of symbol demappers operatively connected to outputs of the demultiplexer; and a plurality of deinterleavers each operatively connected to an output of one of the symbol demappers.

20. The wireless device of claim 15, wherein the receiver signal processor comprises:
   a symbol demapper;
   a deinterleaver operatively connected to an output of the symbol demapper; and
   a demultiplexer operatively connected to an output of the deinterleaver.

21. The wireless device of claim 15, wherein the receiver signal processor comprises:
   a deinterleaver;
   a symbol demapper operatively connected to an output of the deinterleaver; and
   a demultiplexer operatively connected to an output of the symbol demapper.

* * * * *